(12) United States Patent
Samsonov

(10) Patent No.: US 7,240,069 B2
(45) Date of Patent: Jul. 3, 2007

(54) SYSTEM AND METHOD FOR BUILDING A LARGE INDEX

(75) Inventor: Yevgeniy A. Samsonov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 10/714,186

(22) Filed: Nov. 14, 2003

(65) Prior Publication Data

US 2005/0108189 A1    May 19, 2005

(51) Int. Cl.
  *G06F 17/00*    (2006.01)
  *G06F 17/30*    (2006.01)

(52) U.S. Cl. .................. 707/102; 707/2; 707/101

(58) Field of Classification Search ............ None
See application file for complete search history.

(56) References Cited

U.S. PATENT DOCUMENTS 6,360,215 B1 *  3/2002  Judd et al. ............... 707/3
6,778,977 B1 *  8/2004  Avadhanam et al. ..... 707/2

* cited by examiner

*Primary Examiner*—Joon Hwan Hwang
(74) *Attorney, Agent, or Firm*—Workman Nydegger

(57) ABSTRACT

An improved system and method for building a large index is provided. The system and method may be used by many applications to build a large index, including a search engine for crawling the World Wide Web. An indexing engine with an index merger may build an index of content by using a staged pipeline for merging sub-indexes. The index merger may concurrently merge sub-indexes created at multiple stages during indexing of content by using threads from a merging thread pool. When all the content has been indexed, the system may proceed to perform a final merge of all available sub-indexes to form a master index. The system and method may build a large index of any type of content including documents, images, audio streams, video streams and other types of content.

36 Claims, 6 Drawing Sheets

SYSTEM AND METHOD FOR BUILDING A LARGE INDEX

FIELD OF THE INVENTION

The invention relates generally to computer systems, and more particularly to an improved system and method for building a large index.

BACKGROUND OF THE INVENTION

Many applications, such as a search engine, may create an index of content to allow fast resolution of various types of queries about the content indexed. For many of these applications, the resulting size of an index created is usually too large to fit into computer volatile memory. As a result, a content index must be stored in persistent storage, such as on disk or other permanent storage devices, as it is built. To do so, small individual sub-indexes may be typically first produced in volatile memory and then persisted in permanent storage. Each of these sub-indexes provides a content index for part of the content to be indexed. After each sub-index is created in volatile memory, it may be merged with a single index persisted in permanent storage to build a master index. To allow for resolving queries while still indexing the documents, each small sub-index may be persisted as non-modifiable such as a read-only file.

Several problems arise from building a content index in this manner. First, this process is inefficient for applications that may periodically index a vast amount of content. As the master index grows with each merge, it becomes increasingly expensive to add each additional smaller sub-index created in volatile memory and indexing performance degrades correspondingly. Second, indexing of content is interrupted while such merging occurs. There are some applications that may index content continuously, such as a search engine for the World Wide Web. Such an application must wait until merging is finished. Third, this sequential process is not scalable beyond a single CPU. As content storage progressively grows, multiprocessor systems need to be efficiently leveraged for indexing content storage.

What is needed is a way for building a content index that may offer better performance than the process of indexing part of the content and then interrupting indexing to merge a sub-index with a master index. The solution should support continuous indexing of content for applications, such as a search engine, that may continuously index content. Additionally, such a system should scale as the number of CPUs used by the system increases. Moreover, such a system and method should promote efficient query performance as the index is built.

SUMMARY OF THE INVENTION

Briefly, the present invention provides an improved system and method for building a large index. To this end, the indexing process of the present invention may build an index of content by using a staged pipeline for merging sub-indexes. The number of stages and the number of sub-indexes at each stage may be determined based upon the number of content items to index, the number of items for which index information may fit into an index in volatile memory, and the number of sub-indexes allowed to be stored. Sub-indexes for content may be initially built in volatile memory. The first group of such sub-indexes may be stored in persistent storage as belonging to the first stage in the pipeline. In one embodiment, as soon as half of the sub-indexes are available at a given stage, those sub-indexes from that stage may be merged into a single new sub-index belonging to the next stage. If there are any other stages ready for merging sub-indexes, then the sub-indexes are merged for each of the other stages that may be ready. Advantageously, multiple processes may concurrently merge sub-indexes at each stage while indexing of content continues. If all the content has been indexed, then the system may proceed to perform a final merge of all available sub-indexes to form a master index.

The present invention also provides an architecture for building an index of content by using a staged pipeline for merging sub-indexes. An indexing engine may be operably coupled with an indexer plug-in that may include an index merger. The index merger may concurrently merge sub-indexes created at multiple stages during indexing of content by using threads from a merging thread pool. The index engine may be operably coupled to various content storage and content indexes. The content storage may be any persistent storage including file systems, mail servers, databases, and other types of storage. The content stored may be any type of content including documents, images, audio streams, video streams and so forth.

The architecture of the present invention may be used by many applications to build a large index. For example, a search engine may include a gatherer engine operably coupled to index engine. The gatherer engine may include a filter daemon, a filtering thread pool, and a gatherer plug-in. The gatherer plug-in may include functionality for crawling the World Wide Web and selecting content to be filtered by the filter daemon. The filter daemon may include a protocol handler for accessing content and a filter for extracting various information from the content accessed. There may be a different filter for each type of content such as a filter for documents, a filter for images, a filter for audio streams, a filter for video streams, and so forth.

Advantageously, the present invention may scale to provide a staging pipeline to index an increased amount of content with only a corresponding logarithmic increase in the number of sub-indexes required. Thus, the present invention also promotes efficient query performance as the system scales for indexing increasing amounts of content. Furthermore, the present invention may utilize concurrent merging processes to merge sub-indexes at any stages in the pipeline and may scale with an increase in the number of CPUs added to the system by executing these merging processes on these additional CPUs.

Other advantages will become apparent from the following detailed description when taken in conjunction with the drawings, in which:

DETAILED DESCRIPTION

Exemplary Operating Environment

Figure 1:
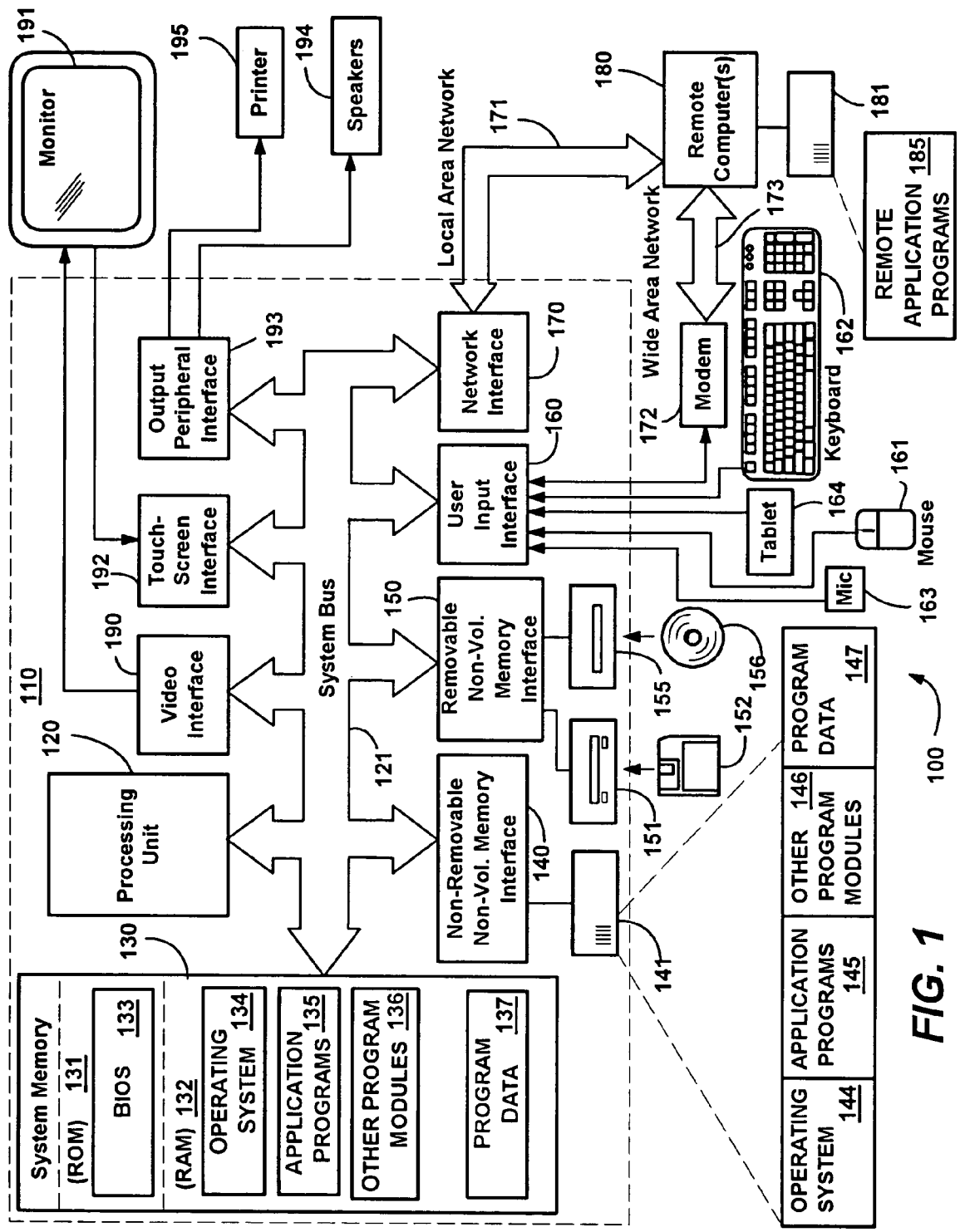
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read. only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Building a Large Index

The present invention is generally directed towards a system and method for building a large index. An indexing process will be described that may build an index of content by using a staged pipeline for merging sub-indexes. The method described may determine the number of stages for the pipeline and the number of sub-indexes at each stage. Sub-indexes for content may then be initially built in volatile memory. The first group of such sub-indexes may be subsequently stored in persistent storage as belonging to the first stage in the pipeline. When any stages in the pipeline are ready for merging sub-indexes, then the sub-indexes are merged. Advantageously, multiple processes may concurrently merge sub-indexes at each stage. When all the content has been indexed, the system may proceed to perform a final merge of all available sub-indexes to form a master index.

To build a content index in such a manner, an indexing engine will be described that may be operably coupled with an indexer plug-in that may include an index merger. The index merger may concurrently merge sub-indexes created at multiple stages during indexing of content by using threads from a merging thread pool. The index engine may be operably coupled to various content storage and content indexes. The content stored may be any type of content including documents, images, audio streams, video streams and so forth.

As will be seen, the architecture of the present invention may be used by many applications to build a large index. For example, a search engine may include a gatherer engine operably coupled to index engine. The gatherer engine may include functionality for crawling the World Wide Web, selecting content to be indexed, and filtering the content for indexing. As will be understood, the various block diagrams, flow charts and scenarios described herein are only examples, and there are many other scenarios to which the present invention will apply.

Figure 2:
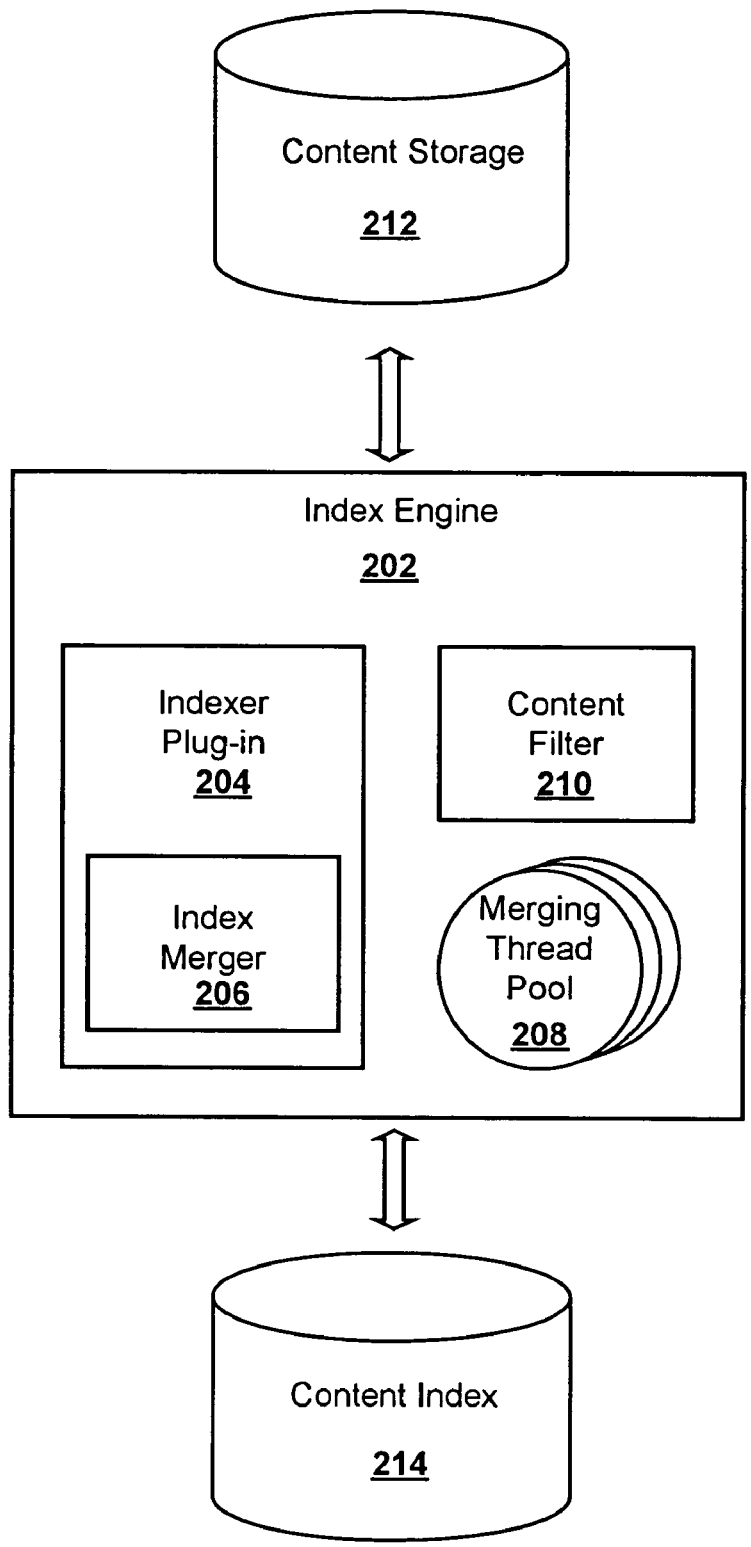
FIG. 2 is a block diagram generally representing an exemplary architecture of system components for building a large index, in accordance with an aspect of the present invention.

Turning to FIG. 2 of the drawings, there is shown a block diagram generally representing an exemplary architecture of system components for building a large index. Those skilled in the art will appreciate that the functionality implemented within the blocks illustrated in the diagram may be implemented as separate components or the functionality of several or all of the blocks may be implemented within a single component. As an example, the functionality of the content filter 210 in the index engine 202 may be implemented in a separate component. Or the functionality of the content filter 210 may be included in the indexer plug-in 204.

The index engine 202 shown in FIG. 2 may include an indexer plug-in 204, a content filter 210, and a merging thread pool 208. The index engine 202 may be any executable software code including a kernel component, an application component, a linked library, an object, and so forth. In general, the index engine 202 may receive content from any content storage, such as content storage 212, and create an index of the content, such as content index 214. The indexer plug-in 204 may be a component, a linked library, an object, or other executable code. The indexer plug-in 204 may provide functionality for creating an index of content received by the index engine 202 and storing the index in content storage 212. The indexer plug-in 204 may include an index merger 206 that may support continuous indexing of content by staging merging of built sub-indexes. The merging thread pool 208 may have several threads for merging a group of sub-indexes at a given stage in building a content index. The content filter 210 may extract various elements from content residing in content storage 212. The particular elements may vary depending on the type of content. For example, in an embodiment where the content stored may be documents, the particular elements may be words. In another embodiment where the content stored may be images, the particular elements may be properties of an image including the image format such as GIF, JPEG or BMP. There may be a different content filter 210 for each type of content such as a content filter for documents, a content filter for images, a content filter for audio streams, a content filter for video streams, and so forth.

The index engine 202 may be operably coupled to various content storage 212 and a content index 214. Content storage 212 may be any persistent storage including file systems, mail servers, databases, and other types of storage. The content stored may be any type of content including documents, images, audio streams, video streams and so forth. The content index 214 may employ any type of data structure such as a sequential table, a hash table, a tree, and so forth.

Figure 3:
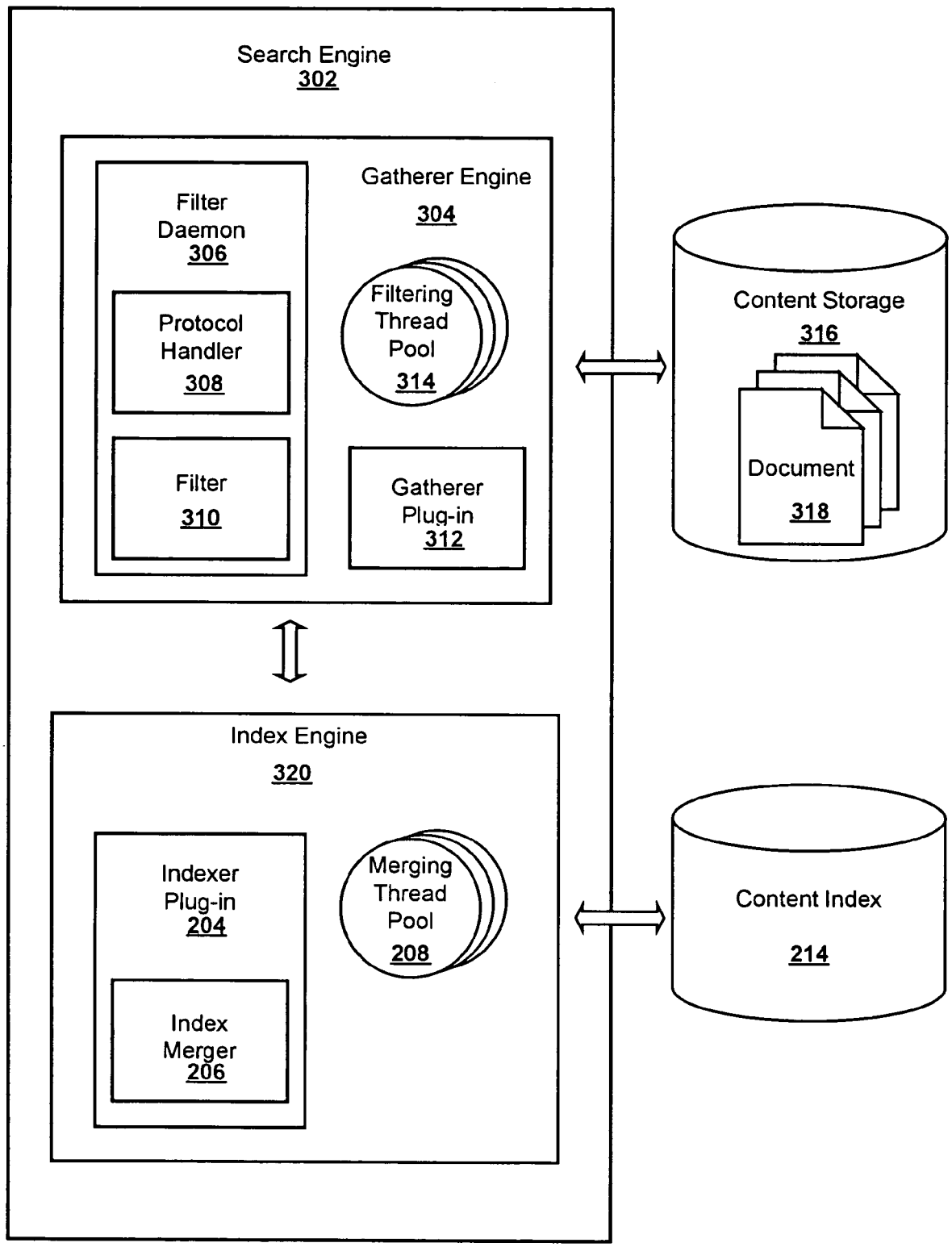
FIG. 3 is a block diagram generally representing an exemplary embodiment of system components for building a large index for a search engine, in accordance with an aspect of the present invention.

There are many applications which may build a large index using the present invention. A search engine is one example among these many applications. FIG. 3 presents a block diagram generally representing an exemplary embodiment of system components of a search engine that may build a large index. In this embodiment a search engine 302 may include a gatherer engine 304 operably coupled to index engine 320. In general, the search engine 302 may be used to crawl the World Wide Web to discover content and create an index of content discovered to allow fast resolution of various types of queries about the content indexed. The search engine 302 may be any executable software code including a kernel component, an application component, a linked library, an object, and so forth. In addition to content index 214, the search engine 302 may be operably coupled to various content storage, such as content storage 316 storing documents 318.

The gatherer engine 304 may include a filter daemon 306, a filtering thread pool 314, and a gatherer plug-in 312. The filter daemon 306 may include a protocol handler 308 and a filter 310. The protocol handler 308 may be specific for a particular content storage and allows access to retrieve content from the content storage. The filter 310 may extract various elements from content residing in content storage 316. For example, words may be the particular elements extracted from documents 318. However, the particular elements extracted may vary depending on the type of content. In an embodiment where the content stored may include images, the particular elements may be properties of an image including the image format such as GIF, JPEG or BMP. There may be a different filter 310 for each type of content such as a filter for documents, a filter for images, a filter for audio streams, a filter for video streams, and so forth. The filtering thread pool 314 may have several threads using the filtering daemon 306 for filtering content from documents 318 or other content stored in content storage 316. The gatherer plug-in may include functionality for crawling the World Wide Web and selecting content to be filtered by the filter daemon 306.

The gatherer engine 304 may provide a path identifying the location of the content and elements extracted from the content to the index engine 320. In general, the index engine 320 may receive a path identifying the location of content from any content storage, such as content storage 316, along with elements extracted from the content and create an index of the content, such as content index 214. Index engine 320 is similar to index engine 202 of FIG. 2 with the exception that the functionality of the content filter is performed instead by the gatherer engine 304.

Figure 4:
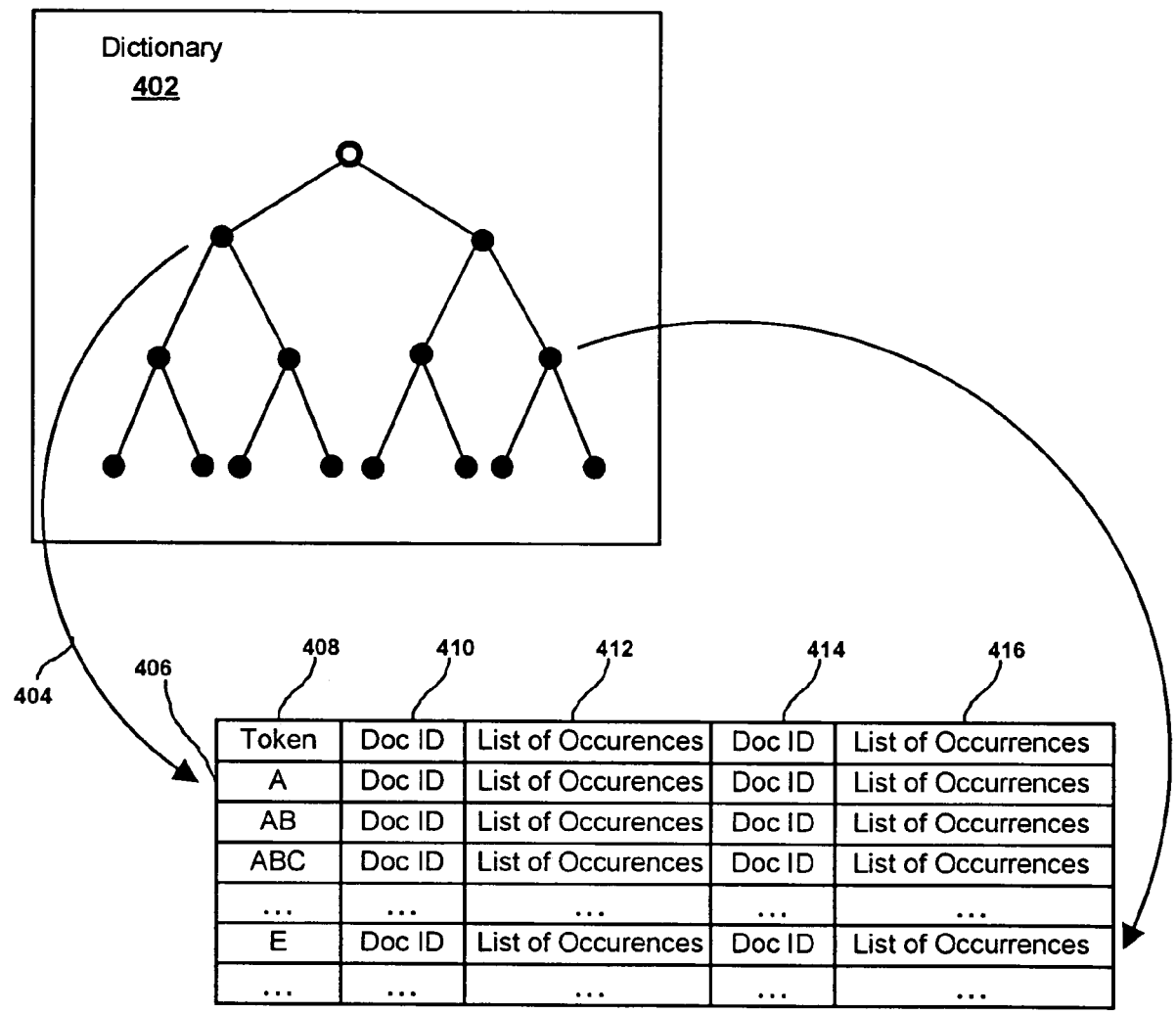
FIG. 4 is an illustration generally representing an exemplary data structure for a large index, in accordance with an aspect of the present invention.

There are many different data structures that may be used for representing a large index and FIG. 4 presents an illustration generally representing one exemplary data structure for a large index, a dictionary. The dictionary 402 illustrated in FIG. 4 may be implemented as a tree and map information about the content to a content identifier. For example, a dictionary may map individual words found in documents to a particular document identifier and also to a position inside the document. Each node of the tree may include information about content that is indexed or may include a pointer to a record including information about content, such as the pointer 404 illustrated as pointing to record 406. A record may have various information about content including the particular element extracted from the content such as token 408, a content identifier such as document identifier 410, a list of where the particular element occurred within the content 412, and there may be a series of other content identifiers such as document identifier 414 along with a corresponding list of where the particular element occurred within the content 416. There may be a different tree for each type of content indexed such as a tree for documents, a tree for images, a tree for audio streams, a tree for video streams, and so forth. The specific information for each particular element extracted from the content may also vary for each type of content. For instance, the information for an image may include properties of the image such as the image format, the image identification, the image location, and so forth. Those skilled in the art will appreciate that any type of data structure may be used to represent an index of content such as a sequential table, a hash table, a tree, or other data structure.

Figure 5:
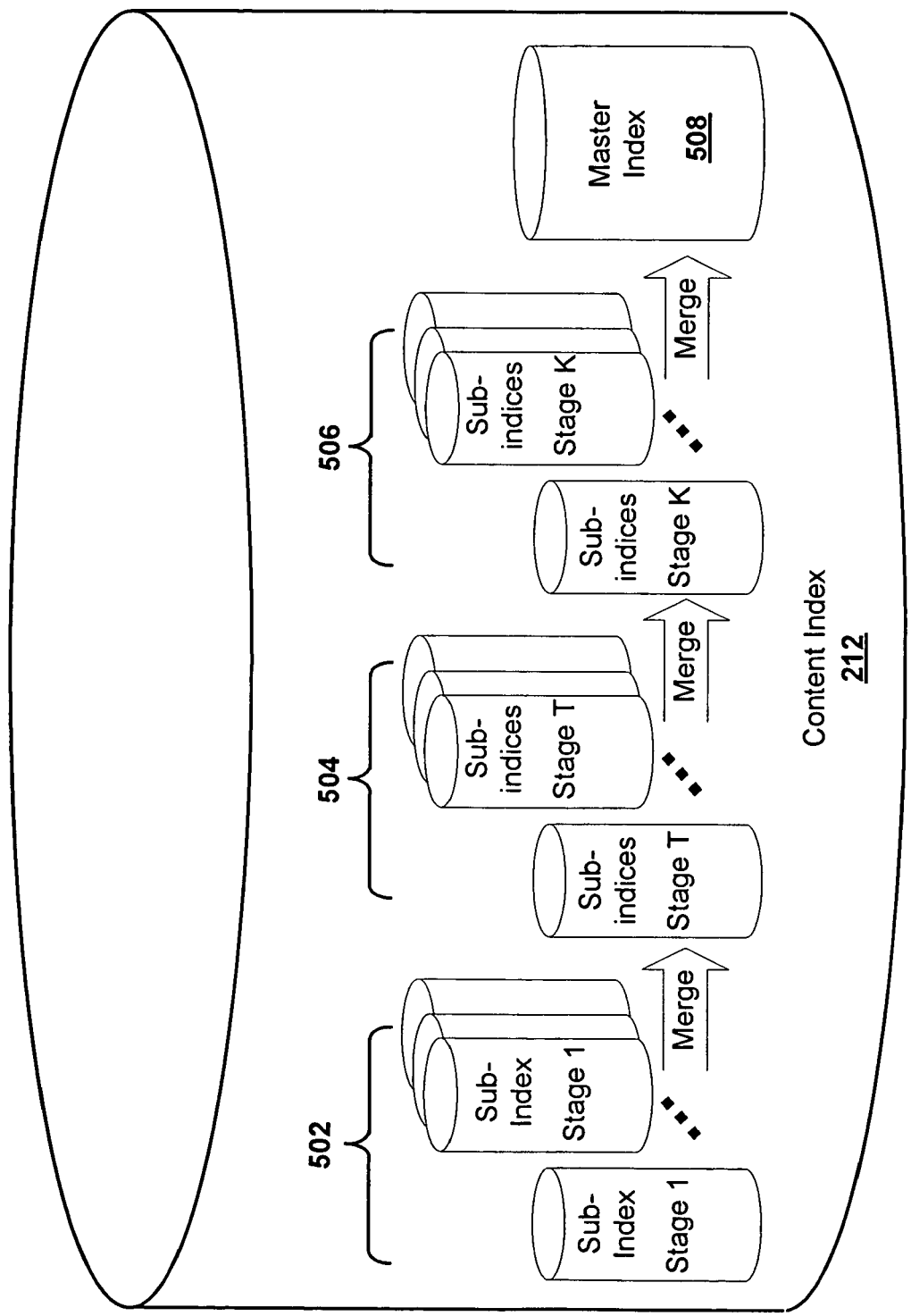
FIG. 5 is an illustration generally representing persistent storage of sub-indexes during various stages of building a large index, in accordance with an aspect of the present invention.

FIG. 5 presents an illustration generally representing persistent storage of sub-indexes during various stages of building a large index. In describing FIG. 5, documents such as illustrated in content storage 316 of FIG. 3 will be used as the example of content being indexed. Initially, an index of content for a group of documents is built in volatile memory until the index exhausts the memory allocated. The index built in volatile memory is then stored as a sub-index in persistent storage such as content index 212. A group of such sub-indexes may then be persistently stored as belonging to stage 1 502 as illustrated in FIG. 5. In an alternate embodiment, several indexes built in volatile memory may be merged in a sub-index stored at stage 1 in persistent storage until the sub-index reaches a particular size. When the number of such persisted sub-indexes reaches a predefined limit, then the sub-indexes may be merged to form a larger sub-index which is stored as belonging to stage T 504 as illustrated in FIG. 5. In one embodiment, a second set of sub-indexes may be used at each stage for storing data while the first set is merged, so that indexing may continue without interruption.

The process of merging may be repeated again at stage T 504. When the number of persisted sub-indexes at stage T 504 reaches a predefined limit, then the sub-indexes may be merged to form a larger sub-index which is stored as belonging to stage K 506 as illustrated in FIG. 5. Finally, when the number of such persisted sub-indexes at stage K 506 reaches a predefined limit, then the sub-indexes may be merged to form a master index 508.

Figure 6:
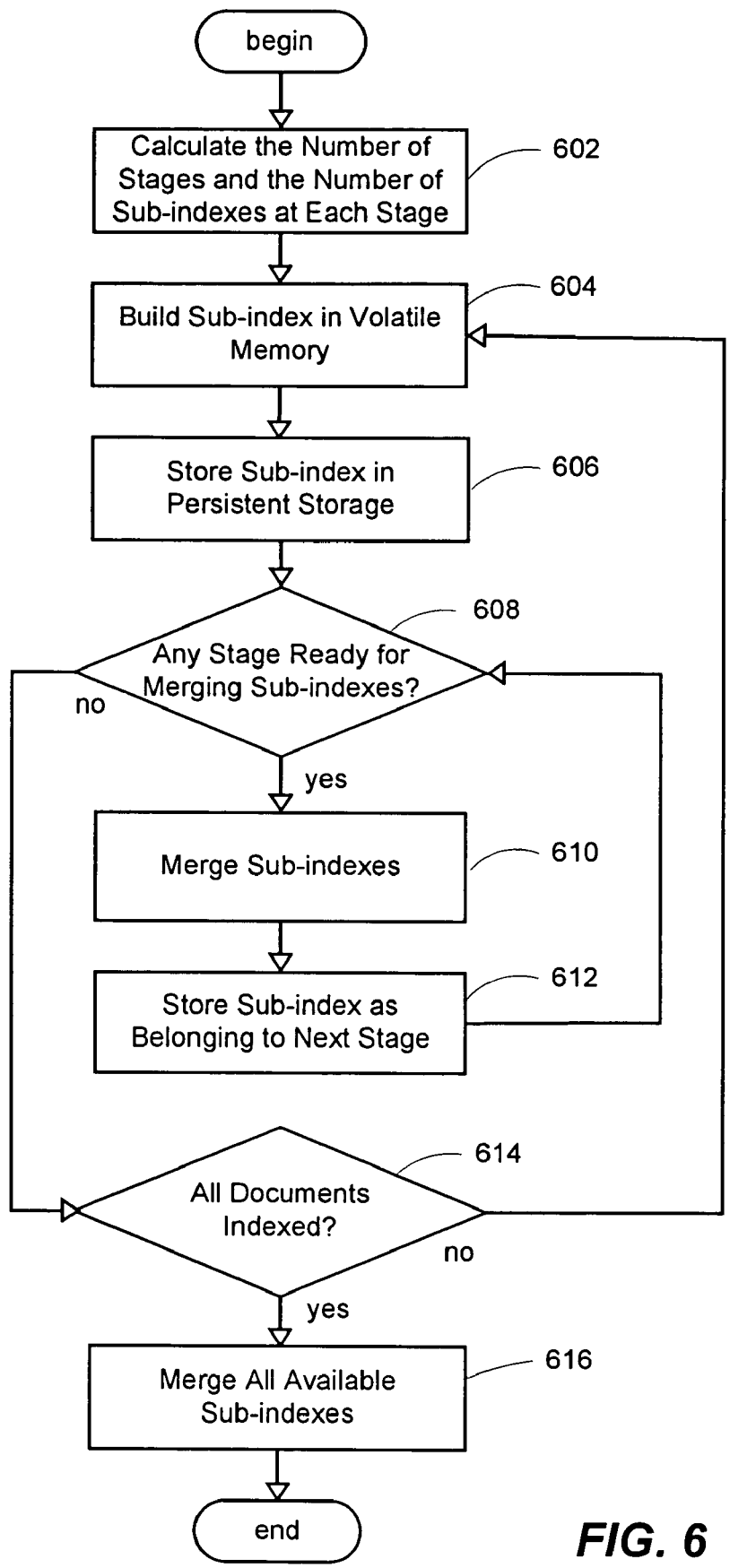
FIG. 6 is a flowchart generally representing example steps undertaken by the system for building a large index, in accordance with an aspect of the present invention.

FIG. 6 presents a flowchart generally representing example steps undertaken by the system for building a large index. At step 602, the number of stages and the number of sub-indexes at each stage may be calculated. In one embodiment, the number of stages and the number of sub-indexes may be calculated to satisfy two inequalities as follows. Given the total number of documents to index (N), the number of documents for which index information may fit into an index in volatile memory (Nv) and the number of persisted sub-indexes allowed (n), calculate the number of stages (k) and the number of sub-indexes at each stage (m) to satisfy the two inequalities:

$$m \cdot k + \frac{m}{2} \leq n$$

$$\frac{m}{2}\left(\frac{m}{2}\right)^k \cdot Nv \geq N$$

For example, if there are one million documents to index (N=1M), and the index information for one thousand documents may fit in the index in volatile memory (Nv=1K) and the number of persisted sub-indexes allowed is fifty (n=50), then there may be two stages (k=2) with twenty sub-indexes at each stage (m=20).

At step 604, a sub-index may be built for documents in volatile memory. In one embodiment, the number of documents which may be indexed in volatile memory may be the number of documents which have index information that may fit into the index in volatile memory. At step 606, a sub-index built in volatile memory may be stored in persistent storage. The first group of sub-indexes created in volatile memory and stored in persistent storage may belong to stage 1 of the process. At step 608, the system determines whether there are any stages ready for merging sub-indexes. In one embodiment, the sub-indexes are ready to be merged at a given stage when half of the number of sub-indexes (m/2) that were determined for that stage is persistently stored. Returning to the example discussed above with twenty sub-indexes at each of the two stages, the sub-indexes belonging to stage 1 may be merged in this case when there are ten sub-indexes persistently stored.

If it is determined that there are any stages ready, the sub-indexes are merged at step 610 and then these merged sub-indexes may be stored as belonging to the next stage at step 612. Returning to the previous example again, once the ten sub-indexes belonging to stage 1 are merged into a single sub-index, this merged sub-index is stored as belonging to stage 2. If there are any other stages ready for merging sub-indexes, then for each of the other stages that are ready, the sub-indexes are merged and the merged sub-indexed is stored as belonging to the next stage. Advantageously, this system and method may utilize k concurrent merging processes, one process for each stage, to merge half of the sub-indexes from one stage into a single new sub-index belonging to the next stage as soon as half of the sub-indexes are available at a given stage. A thread from merging thread pool 208 may be provided for each of the k concurrent processes to perform the merging. In another embodiment, there may be multiple processes for each stage for merging sub-indexes belonging to each stage. In yet another embodiment, the process may optionally examine all of the sub-indexes after any merge and re-assign any sub-index to a different stage based upon the relative sizes of the sub-indexes.

If there are no more stages ready for merging, then the system determines whether all the documents have been indexed at step 614. If there are more documents to index, then the system returns to step 604 to proceed with indexing documents and building a sub-index in volatile memory. However, if all the documents have been indexed, then the system may proceed at step 616 to perform a final merge of all available sub-indexes. At step 616, all the documents that have been indexed may have sub-indexes belonging to stage k+1. In one embodiment the number of such sub-indexes may be half of the number of sub-indexes (m/2) that were calculated for each stage. At step 616 a final merge of all available sub-indexes may be performed to form a master index. After all available sub-indexes have been merged, the system is finished.

Advantageously, the system and method result in providing an approximate average rate of data flow into and out of an individual stage of the processing pipeline. To create m/2 sub-indexes at one stage takes about the same time to merge those sub-indexes into a new sub-index belonging to the next stage. This system and method may scale to provide a staging pipeline to index an increased amount of content with only a corresponding logarithmic increase in the number of sub-indexes required. Thus, the present invention also promotes efficient query performance as the system scales for indexing increasing amounts of content. Furthermore, this system and method may utilize concurrent merging processes to merge sub-indexes from one stage into a single new sub-index belonging to the next stage.

As can be seen from the foregoing detailed description, the present invention provides an improved system and method for building a large index. The architecture of the present invention provides an indexing engine that may be used by any application that may build a large index. Because the present invention may utilize concurrent merging processes to merge sub-indexes at any stages in the pipeline, the system and method may easily scale with an increase in the number of CPUs added to the system by executing these merging processes on these additional CPUs. Moreover, the system and method may support continuous indexing of content for applications, such as a search engine, that may continuously index content. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for building large indexes comprising:
   an index engine operably configured for coupling with an indexer plug-in;
   an indexer plug-in having an index merger for concurrently indexing content in a plurality of sub-indexes and merging at least some of the sub-indexes created at a plurality of stages during indexing of the content, wherein the plurality of stages includes at least a first stage where a first set of sub-indexes are merged into new sub-indexes and at least a second stage where a plurality of new sub-indexes are merged into a master index; and
   one or more computer-executable instructions stored in a computer-readable storage medium, which when executed, cause the computer system to implement a method that includes:
      determining a number of stages for merging the sub-indexes by at least calculating a sum of half a number of sub-indexes at each stage and a product of the number of stages and the number of sub-indexes at each stage, wherein the stages are hierarchically arranged;
      determining the number of sub-indexes for each stage;

building a sub-index in volatile memory;
storing the sub-index in persistent storage as belonging to one of the stages;
merging sub-indexes at a stage before a number of sub-indexes at said stage exceeds the number of sub-indexes determined for said stage; and
storing the merged sub-indexes into the master index.

2. The system of claim 1 further comprising a gatherer engine operably coupled to the index engine for providing content to the index engine for indexing.

3. The system of claim 2 wherein the gatherer engine comprises a gatherer plug-in for selecting content for indexing.

4. The system of claim 2 wherein the gatherer engine comprises a content filter for extracting elements from content for indexing.

5. The system of claim 1 wherein the indexer compresses a content filter for extracting elements from content for indexing.

6. The system of claim 1 wherein the content comprises at least one member of the set comprising documents, images, audio streams and video streams.

7. The system of claim 1 further comprising the master index resulting from merging all of the sub-indexes created during indexing of content.

8. The system of claim 7 wherein the master index comprises a dictionary.

9. A method for building a large index in a computer system, comprising the steps of:
determining a number of stages for merging sub-indexes by at least calculating a sum of half a number of sub-indexes at each stage and a product of the number of stages and the number of sub-indexes at each stage, wherein stages are hierarchically arranged;
determining a maximum number of sub-indexes for each stage;
building a sub-index in volatile memory;
storing the sub-index in persistent storage as belonging to one of the stages;
merging the stored sub-index with at least one other sub-index into a new sub-index at a particular stage before a total number of sub-indexes within said particular stage exceeds the maximum number of sub-indexes determined for said particular stage; and
subsequently merging and storing the new sub-index with at least one additional sub-index in a new stage based on a predetermined number of new sub-indexes existing in the new stage while simultaneously indexing content into at least one sub-index within said particular stage.

10. The method of claim 9 further comprising the step of determining merging of sub-indexes at a certain stage having half of the maximum number of sub-indexes.

11. The method of claim 9 further comprising the step of merging all the sub-indexes to create a master index.

12. The method of claim 9 wherein the sum calculated is not greater than a number of persisted sub-indexes allowed for building the large index in the computer system.

13. The method of claim 9 wherein the step of determining a maximum number of sub-indexes for each stage comprises calculating the sum of half the number of sub-indexes at each stage and the product of the number of stages and the number of sub-indexes at each stage.

14. The method of claim 13 wherein the sum calculated in the step of determining a maximum number of sub-indexes for each stage is not greater than a number of persisted sub-indexes allowed for building the large index in the computer system.

15. The method of claim 9 wherein the step of determining the number of stages for merging sub-indexes comprises calculating a product of a number of items for which index information fits into an index in volatile memory and a quantity of half the number of sub-indexes at each stage raised to the power of one plus the number of stages for merging sub-indexes.

16. The method of claim 15 wherein the product of the number of items calculated is not greater than a number of items to be indexed in the large index of the computer system.

17. The method of claim 9 wherein the step of determining the number of sub-indexes for each stage comprises calculating a product of a number of items for which index information fits into an index in volatile memory and a quantity of half the number of sub-indexes at each stage raised to the power of one plus the number of stages for merging sub-indexes.

18. The method of claim 17 wherein the product of the number of items calculated is not greater than a number of items to be indexed in the large index of the computer system.

19. The method of claim 9 further comprising merging a copy of sub-indexes for at least one stage.

20. The method of claim 9 wherein the step of storing the sub-index in persistent storage comprises storing the sub-index in persistent storage as belonging to a first stage.

21. The method of claim 9 further comprising the step of gathering content from the World Wide Web for indexing.

22. The method of claim 21 wherein the step of gathering content comprises gathering at least one member of the set comprising documents, images, audio streams and video streams.

23. The method of claim 9 further comprising concurrently merging sub-indexes at different stages.

24. The method of claim 23 wherein the step of concurrently merging sub-indexes at different stages comprises using multiple processors.

25. The method of claim 9 wherein the step of building a sub-index comprises filtering information from an item being indexed.

26. The method of claim 25 wherein the step of filtering information comprises using a different filter for each different type of content.

27. A computer readable storage medium having computer-executable instructions stored thereon for performing the method of claim 9.

28. A computer system for building a large index, comprising:
a processor;
means for creating sub-indexes at different stages of a processing pipeline;
means for determining a number of different stages of the processing pipeline for merging sub-indexes by at least calculating a sum of half a number of sub-indexes at each stage of the processing pipeline and a product of the number of different stages of the processing pipeline and the number of sub-indexes at each stage of the processing pipeline, wherein different stages of the processing pipeline are hierarchically arranged;
means for concurrently merging particular sub-indexes at different stages of the processing pipeline; and
means for continuously indexing content into other sub-indexes in a first stage of the processing pipeline while simultaneously merging and storing the particular sub-indexes at different stages of the processing pipeline.

29. The system of claim 28 further comprising means for creating a master index after content has been indexed.

30. The system of claim 28 further comprising means for gathering content to index.

31. The system of claim 28 further comprising means for selecting content to index.

32. The system of claim 28 further comprising means for filtering information from content to build a sub-index.

33. The system of claim 28 wherein means for creating sub-indexes at different stages of a processing pipeline comprises means for determining the number of sub-indexes for each stage of the processing pipeline.

34. The system of claim 28 wherein means for concurrently merging particular sub-indexes at different stages of the processing pipeline comprises means for determining when to merge sub-indexes at different stages of the processing pipeline.

35. The system of claim 28 wherein means for continuously indexing content comprises means for adding new indexing information to sub-indexes at different stages of the processing pipeline while sub-indexes are being merged.

36. A method for building a large index in a computer system, comprising the steps of:

determining a number of stages for merging sub-indexes by at least calculating a sum of half a number of sub-indexes at each stage and a product of the number of stages and the number of sub-indexes at each stage, wherein the stages are hierarchically arranged;

determining the number of sub-indexes for each stage;

building a sub-index in volatile memory;

storing the sub-index in persistent storage as belonging to one of the stages;

merging sub-indexes at a stage before a number of sub-indexes at said stage exceeds the number of sub-indexes determined for said stage; and storing the merged sub-indexes in a next stage.

* * * * *